United States Patent
Wang et al.

(10) Patent No.: US 8,737,062 B2
(45) Date of Patent: May 27, 2014

(54) HANDHELD ELECTRONIC DEVICE

(75) Inventors: Chih-Kuang Wang, Taoyuan County (TW); Tsung-Yuan Ou, Taoyuan County (TW); Li-Hsun Chang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 92 days.

(21) Appl. No.: 13/303,129

(22) Filed: Nov. 22, 2011

(65) Prior Publication Data

US 2013/0128417 A1 May 23, 2013

(51) Int. Cl.
*H05K 5/00* (2006.01)
*H05K 7/00* (2006.01)
*G06F 1/16* (2006.01)

(52) U.S. Cl.
USPC ............ 361/679.56; 361/802; 361/679.01

(58) Field of Classification Search
USPC .......... 361/829, 679.55, 679.3, 679.09, 361/679.02, 802, 679.56, 679.01; 455/567; 312/223.1, 223.2
See application file for complete search history.

(56) References Cited

U.S. PATENT DOCUMENTS

| | | | | |
|---|---|---|---|---|
| 5,550,712 | A * | 8/1996 | Crockett | 361/752 |
| 6,061,231 | A * | 5/2000 | Crockett | 361/679.26 |
| 6,865,076 | B2 * | 3/2005 | Lunsford | 361/679.56 |
| 7,148,875 | B2 | 12/2006 | Rosenberg et al. | |
| 7,595,983 | B2 * | 9/2009 | Okuda | 361/679.56 |
| 7,627,351 | B2 * | 12/2009 | Rich et al. | 455/567 |
| 7,747,297 | B2 * | 6/2010 | Koibuchi et al. | 455/575.4 |
| 8,014,142 | B2 * | 9/2011 | Prest et al. | 361/679.3 |
| 8,493,722 | B2 * | 7/2013 | Chien et al. | 361/679.21 |
| 2010/0156824 | A1 * | 6/2010 | Paleczny et al. | 345/173 |
| 2011/0109571 | A1 * | 5/2011 | He et al. | 345/173 |
| 2012/0326568 | A1 * | 12/2012 | Liu et al. | 310/348 |

* cited by examiner

*Primary Examiner* — Lisa Lea Edmonds
*Assistant Examiner* — Keith Depew
(74) *Attorney, Agent, or Firm* — Jianq Chyun IP Office

(57) ABSTRACT

A handheld electronic device including a lower housing, an upper housing, a touch panel, a display module, a partition, position posts, cushions, and an actuator is provided. The upper housing is above and separated from the lower housing. The touch panel is at an opening of the upper housing and connects with the upper housing. The display module is disposed in the upper housing and connected with the lower housing. The partition is between the display module and the lower housing and connected to the upper housing. The partition has position holes. The position posts are located in their corresponding position holes and connected with the display module. The cushions are located between the corresponding position post and the position hole. The actuator is disposed between the display module and the upper housing to force the upper housing to shift relative to the display module and the lower housing.

9 Claims, 6 Drawing Sheets

HANDHELD ELECTRONIC DEVICE

BACKGROUND OF THE INVENTION

1. Field of the Invention

The application relates to a handheld electronic device. More particularly, the application relates to a handheld electronic device having a vibrating alert function.

2. Description of Related Art

Recently, as applications such as information technology and wireless communication develop, touch panels that serve as a command input interface for handheld electronic devices such as mobile phones and tablet PCs have gradually become more and more common. Mobile phones or tablet PCs are combined with a vibrating mechanism, so that a vibrating alert is provided for incoming calls, or a feedback effect is provided when the user is operating the touch panel. This is a common feature seen in handheld electronic devices.

Common vibrating mechanisms of handheld electronic devices use an eccentric motor to force a housing or a motherboard to provide a vibrating alert. However, using an eccentric motor as a vibrating source not only takes up space within a handheld electronic device, but also occupies the space around the eccentric motor. Space around the eccentric motor is required for the eccentric motor to vibrate and prevent components from being damaged because of being too close to the eccentric motor. Thus, when considering thinner and lighter handheld electronic devices, the configuration and space required for eccentric motors have become a structural design issue.

SUMMARY OF THE INVENTION

The application provides a handheld electronic device that provides a more three-dimensional and diverse vibrating alert effect. The conventional use of eccentric motors serving as a vibrating alert source can be replaced, to save the space required for eccentric motors, and allow more flexibility for design.

The application provides a handheld electronic device including a lower housing, an upper housing, a touch panel, a display module, a partition, a plurality of position posts, a plurality of first cushions, and an actuator. The upper housing is disposed above and separated from the lower housing, and the upper housing has a first opening. The touch panel is disposed at the first opening and is connected to the upper housing. The display module is disposed in the upper housing and connected to the lower housing. The display module is separated from the upper housing, and the first opening exposes a portion of the display module. The partition is disposed between the display module and the lower housing. The partition is connected to the upper housing and includes a plurality of position holes. The position posts are respectively disposed in the corresponding position holes and connected to the display module. The first cushions are respectively disposed in the corresponding position holes, and are propped between the corresponding position posts and the position holes. The actuator is disposed between the display module and the upper housing to force the upper housing to shift between the display module and the lower housing.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF DISCLOSED EXEMPLARY EMBODIMENTS

Figure 1:
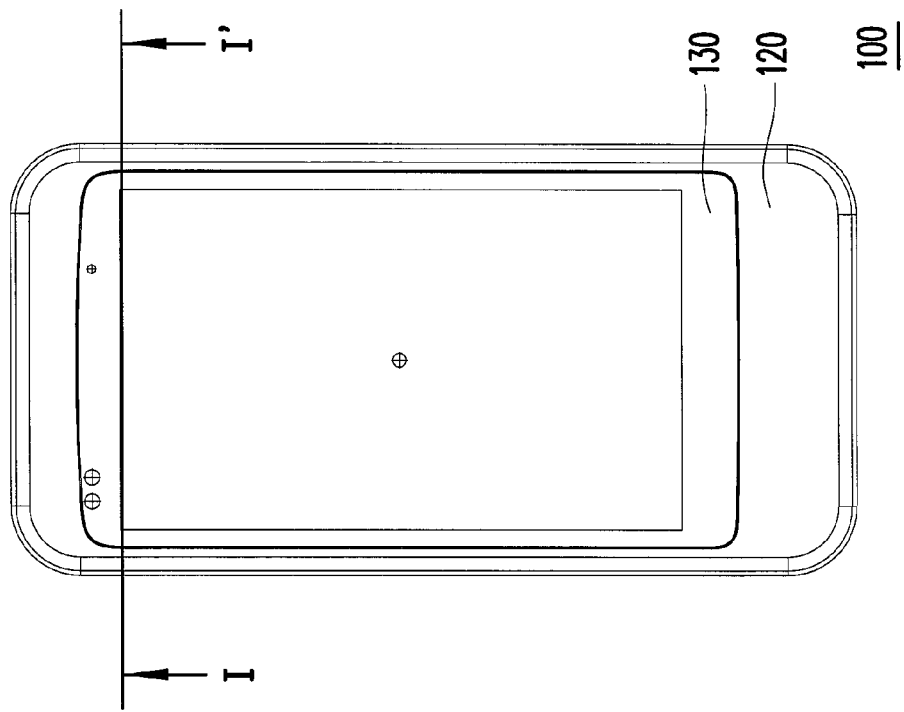
FIG. 1 is a schematic view of a handheld electronic device according to an embodiment of the invention.
Figure 1:
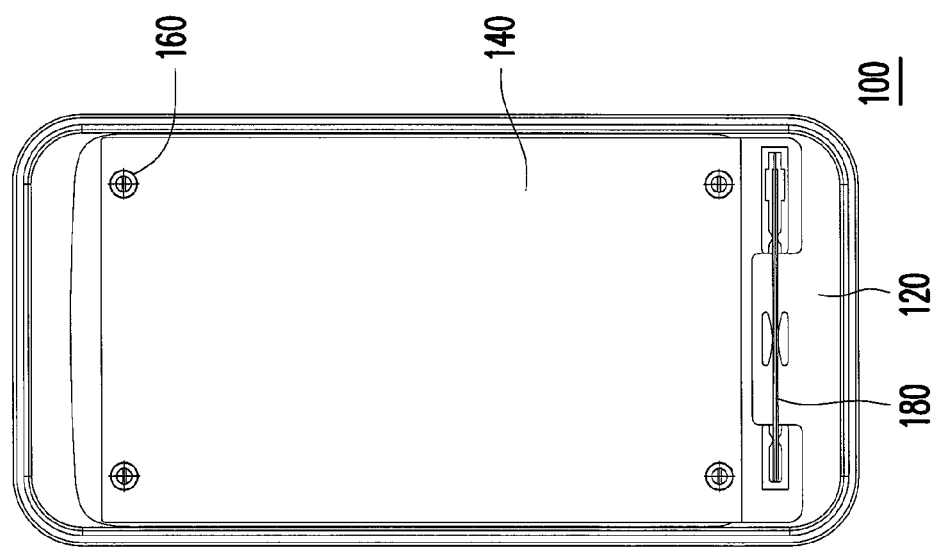
Figure 2:
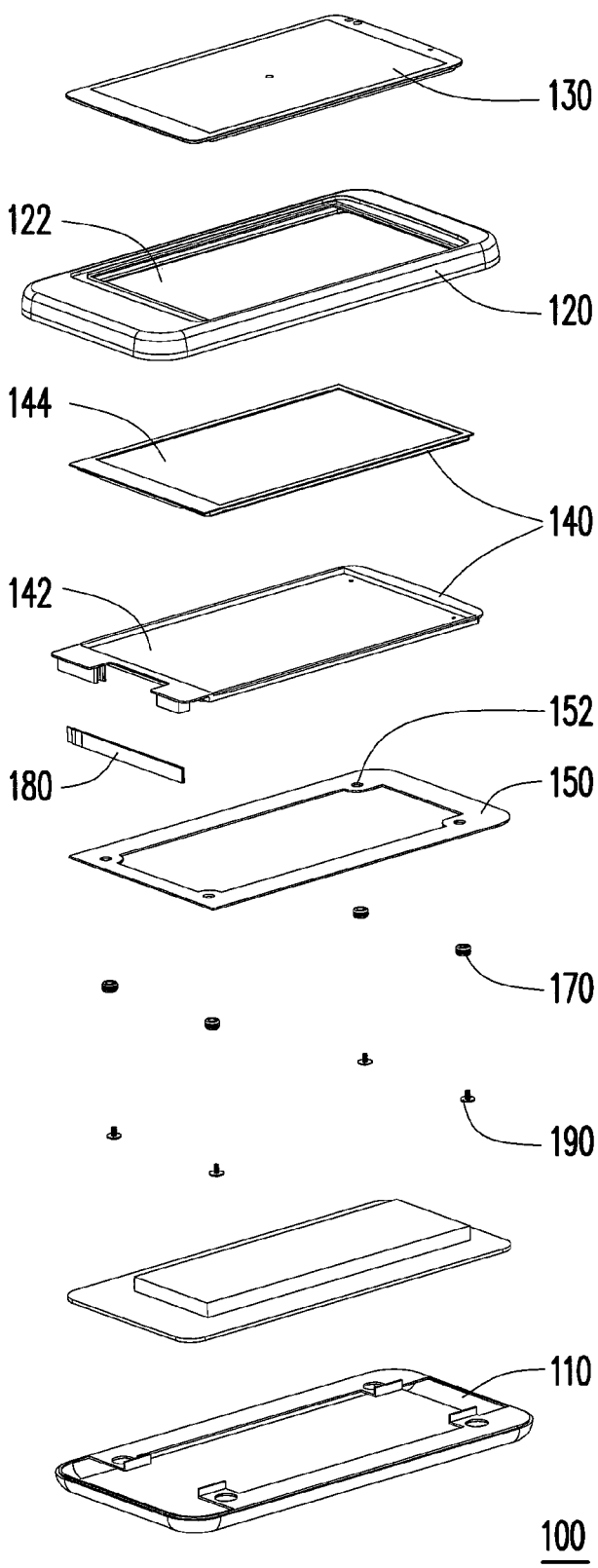
FIG. 2 is an exploded view of a handheld electronic device according to an embodiment of the invention.
Figure 3:
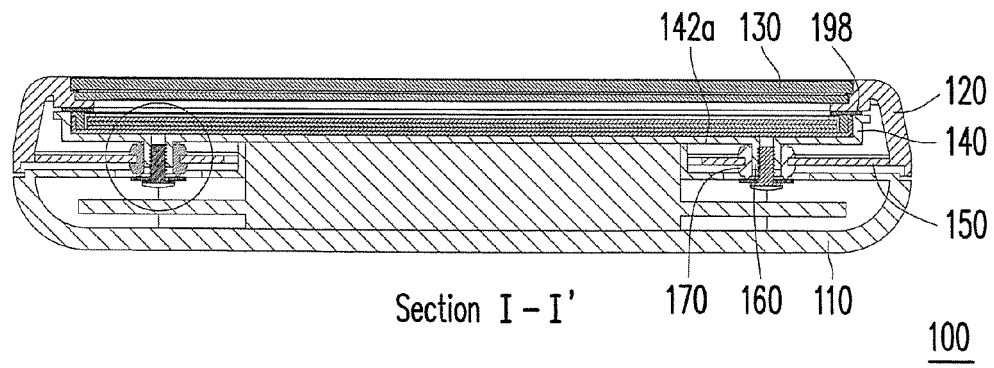
FIG. 3 is a cross-sectional view of a handheld electronic device along line I-I' according to an embodiment of the invention.

FIG. 1 is a schematic view of a handheld electronic device according to an embodiment of the invention. FIG. 2 is an exploded view of the handheld electronic device of FIG. 1. FIG. 3 is a cross-sectional view of the handheld electronic device of FIG. 1 along line I-I'. Referring to FIG. 1 to FIG. 3, the handheld electronic device 100 includes a lower housing 110, an upper housing 120, a touch panel 130, a display module 140, a partition 150, a plurality of position posts 160, a plurality of first cushions 170, and an actuator 180. The actuator 180 can be a piezoelectric component. The actuator 180 is disposed between the display module 140 and the upper housing 120. The display module 140 and the upper housing 120 respectively props against the actuator 180. When the handheld electronic device 100 receives an external command such as an incoming call or a touch operation, the actuator 180 can force the upper housing 120 to shift relative to the display module 140 and create a vibrating alert. The upper housing 120 is disposed above and separated from the lower housing 110, and the upper housing 120 has a first opening 122.

The touch panel 130 is disposed at the first opening 122 and is connected to the upper housing 120. The display module 140 is disposed in the upper housing 120 and connected to the lower housing 110. The display module is separated form the upper housing 120, and the first opening 122 of the upper housing 120 exposes a portion of the display module 140. In addition, the display module 140 includes a frame 142 and a display panel 144. The frame 142 carries the display panel 144. The partition 150 is disposed between the display module 140 and the lower housing 110, and is connected to the upper housing 120. In addition, the partition 150 has a plurality of position holes 152. The position posts 160 connect to a bottom portion 142a of the frame 142 of the display module 140, and the position posts 160 are respectively positioned in the position holes 152. The first cushions 170 are respectively disposed in the position holes 152, and are propped between the corresponding position posts 160 and the position holes 152.

Figure 4:
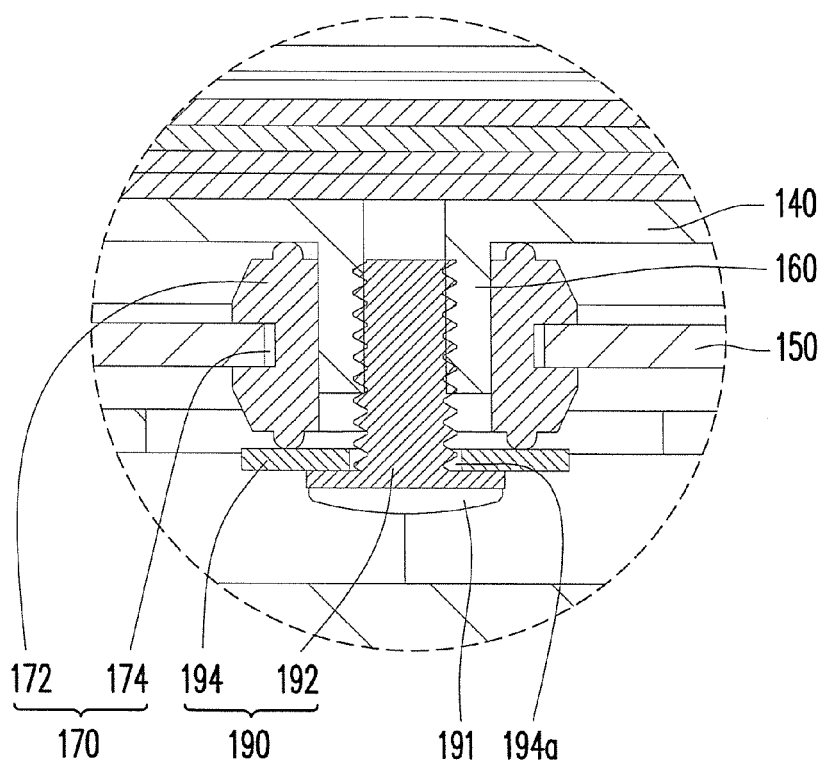
FIG. 4 is an enlarged view of the position posts and the first cushions of FIG. 3.

FIG. 4 is an enlarged view of the position posts 160, the first cushions 170, and the partition 150 of the embodiment. Referring to FIG. 4, each first cushion 170 is, for example, a washer 172, surrounding the corresponding position post 160. A groove 174 is encircled around the outer circumferential surface of the washer 172. The partition 150 is wedged into the groove 174 through the position hole 152. The first cushion 170 can be elastic material such as rubber or foam.

In addition, an end of the position post 160 can have a locking element 190, used to fix the first cushion 170 onto the position post 160. Each locking element 190 includes a head portion 191. The outer diameter of the head portion 191 is greater than the outer diameter of the position post 160. The display module 140 and the head portion 191 respectively prop against the top and bottom sides of the washer 172. Therefore, when the locking element 190 is fixed to the position post 160, the first cushion 170 can be fixed to the position post 160 by the head portion 191 and the display module 140.

In the embodiment, the locking element 190 includes a screw 192 and a spacer 194, and the spacer 194 includes a through hole 194a. When the locking element 190 is fixed to the position post 160, the screw 192 passes through the through hole 194a of the spacer 194 to fix to the position post 160. The head portion 191 of the screw 192 is located on the spacer 194, so that the first cushion 170 is fixed by way of the spacer 194. In other embodiments that are not shown, the spacer 194 can be omitted. When the locking element 190 is fixed to the position post 160, the head portion 191 of the screw 192 can be used to fix the first cushion 170. When the display module 140 shifts relative to the upper housing 120, the first cushion 170 can reduce the displacement between the display module 140 and the partition 150.

In addition, as seen in FIG. 3, a second cushion 198 can be between the periphery of the first opening 122 of the upper housing 120 and the display module 140, to serve as a cushion and space between the upper housing 120 and the display module 140. When the display module 140 shifts relative to the upper housing 120, the second cushion 198 can reduce the relative displacement between the display module 140 and the upper housing 120. The second cushion 198 can be elastic material such as rubber or foam.

Figure 5:
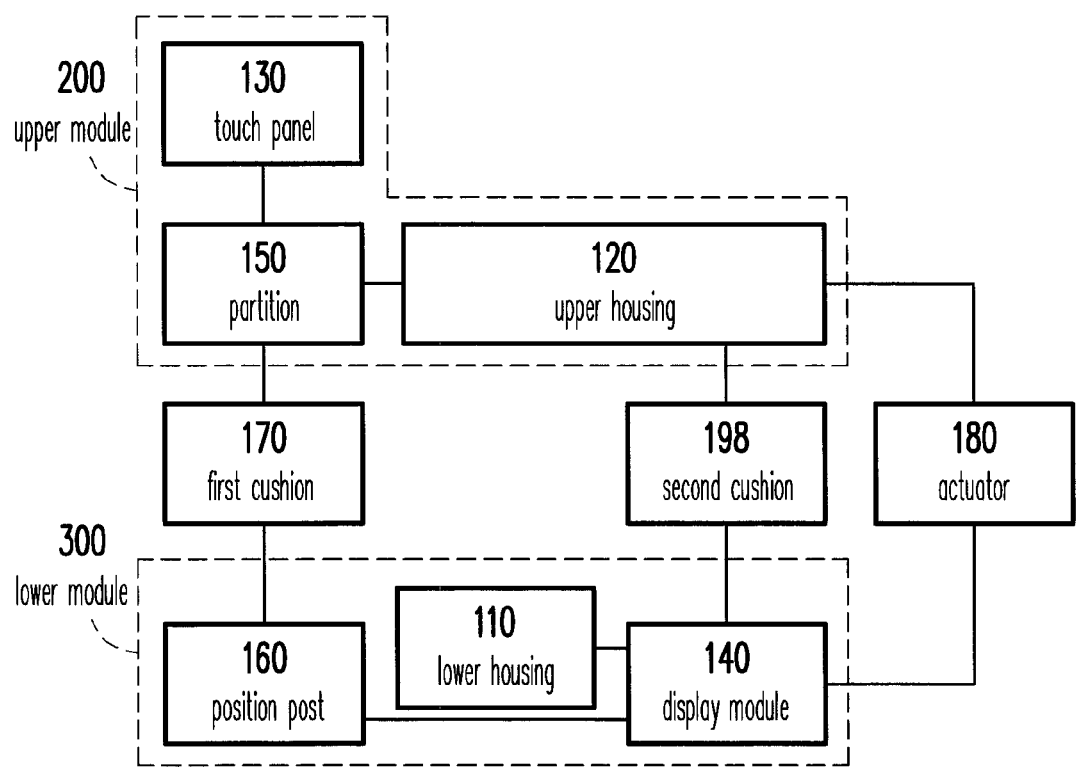
FIG. 5 is a structural connection block diagram of an embodiment of the invention.

FIG. 5 is a structural connection block diagram of the embodiment. Referring to FIG. 5, in the embodiment, the structural connections in the handheld electronic device 100 can be divided into an upper module 200 and a lower module 300. The touch panel 130 and the partition 150 both connect to the upper housing 120, and can be regarded as the upper module 200. The position post 160 and the display module 140 are connected, and the display module 140 is also connected to the lower housing; this is regarded as the lower module 300. The upper housing 120 and the lower housing 110 are separated from each other, and the first cushion 170 serves as a space between the partition 150 and the position post 160. The second cushion 198 serves as a space between the periphery of the first opening 122 of the upper housing 120 and the display module 140. The actuator 180 can force the upper module 200 and the lower module 300 to shift relatively. Thus, the application can replace the design of conventional eccentric motors that generate vibrating alerts. In order to describe the method of the actuator 180 forcing the upper housing 120 and the display module 140 to shift relatively in detail, the following embodiment is described.

Figure 6A:
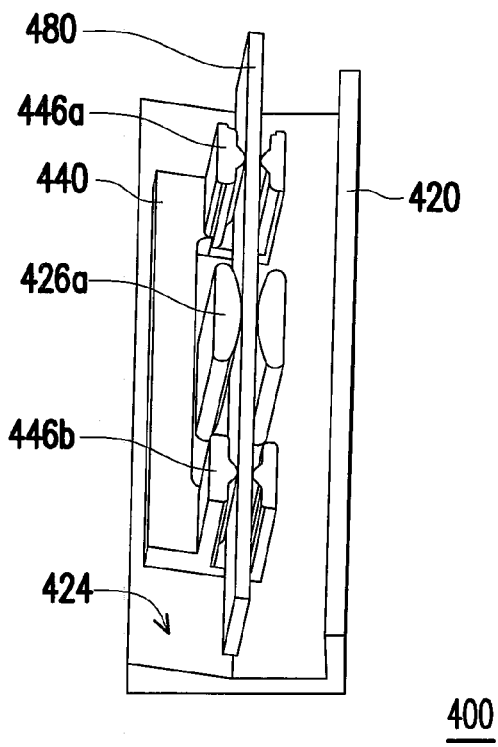
FIG. 6A is an enlarged view of an actuator disposed between an upper housing and a display module.
Figure 6B:
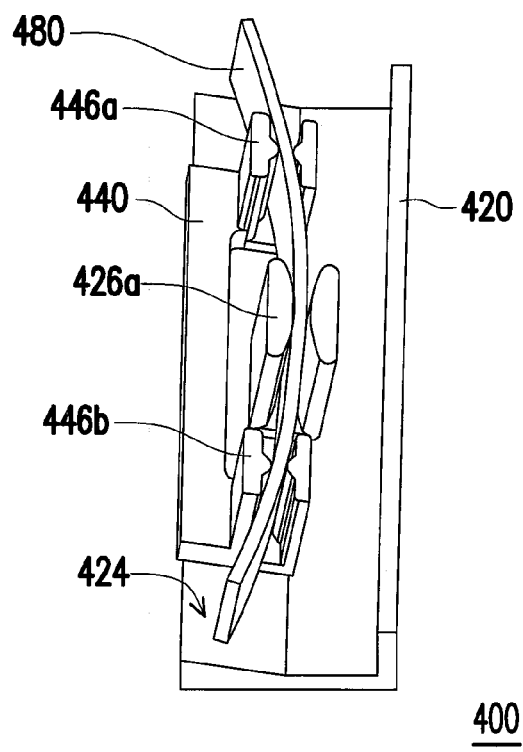
FIG. 6B is a schematic view of the enabled actuator bent to force the upper housing to shift relative to the display module.

FIG. 6A is an enlarged view of an actuator disposed between an upper housing and a display module of the handheld electronic device. FIG. 6B is a schematic view of the enabled actuator bent to force the upper housing to shift relative to the display module. Referring to FIG. 6A and FIG. 6B, the upper housing 420 of the handheld electronic device 400 further includes a slant surface. The slant surface 424 props against the display module 440, and so the upper housing 420 and the display module 440 can shift relatively along the slant surface 424. The display module 440 includes a first clamp portion 446a and a second clamp portion 446b that respectively clamp the two ends of the actuator 480. The upper housing 420 includes a third clamp portion 426a for clamping the middle of the actuator 480. In FIG. 5B, after the actuator 480 is enabled, the actuator is bent so that the third clamp portion 426a is forced to shift relative to the first clamp portion 446a and the second clamp portion 446b, and the upper housing 420 is forced to shift along the slant surface 424 relative to the display module 440.

In contrast, in another embodiment of the invention that is not shown, the display module can include only a fourth clamp portion that clamps the middle of the actuator. The upper housing includes a fifth clamp portion and a sixth clamp portion, to respectively clamp the two ends of the actuator. After the actuator is enabled to force the fourth clamp portion to shift relative to the fifth and sixth clamp portions. Therefore the upper housing is forced to shift along the slant surface relative to the display module.

Figure 7:
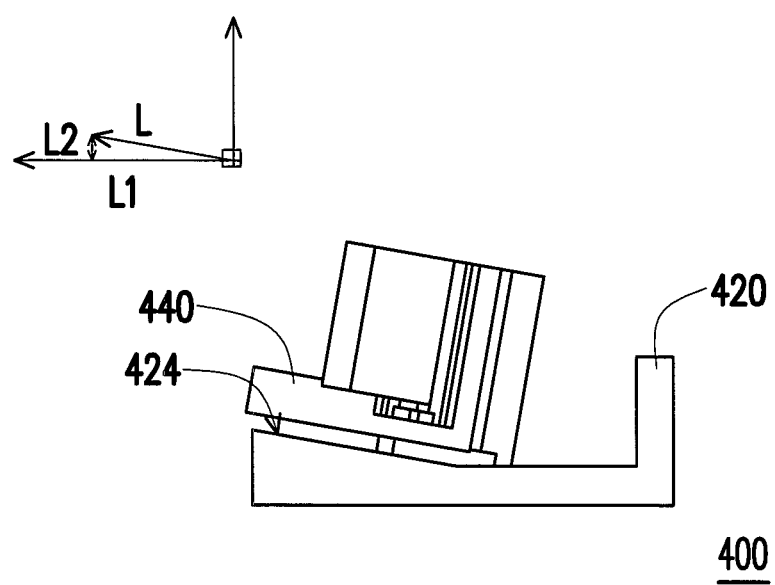
FIG. 7 is a partial side view of FIG. 6B.

FIG. 7 is a partial side view of FIG. 6B. In the embodiment, when the handheld electronic device 400 receives an external command, the actuator 480 forces the upper housing 420 to shift relative to the display module 440. The display module 440 shifts along the slant surface 424 with a displacement L. The displacement L can be divided into a first displacement component L1 parallel to the display module 440 and a second displacement component L2 perpendicular to the display module according to the slant surface 424.

To sum up, the handheld electronic device of the application uses the relationships in structural connections, along with an actuator with a piezoelectric component, to cause a vibrating alert through the actuator forcing the upper housing to shift relative to the display module and the lower housing. Thus, conventional eccentric motors used for vibrating alerts can be replaced, which saves the space required for eccentric motors, and allows more flexibility for design. In addition, in the application, a slant surface can further be disposed between the upper housing and the display module. This provides a displacement component parallel to the display module and a displacement component perpendicular to the display module and provides a three-dimensional vibrating alert effect.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A handheld electronic device, comprising:
   a lower housing;
   an upper housing disposed above and separated from the lower housing, wherein the upper housing has a first opening;
   a touch panel disposed at the first opening and connected to the upper housing;
   a display module disposed in the upper housing and fixed to the lower housing, wherein the display module is separated from the upper housing, and the first opening exposes a portion of the display module;
   a partition disposed between the display module and the lower housing, wherein the partition is fixed to the upper housing and includes a plurality of position holes, and the partition and the upper housing fixed together are regarded as an upper module;
   a plurality of position posts respectively disposed in the corresponding position holes, and connected to the display module, wherein the position posts, the display module and the lower housing fixed together are regarded as an lower module, and the lower module is separated from the upper module;

a plurality of first cushions respectively disposed in the corresponding position holes and propped between the corresponding position post and the position hole; and an actuator disposed between the display module and the upper housing to force the upper module constituted by the partition and the upper housing to move relative to the lower module constituted by the position posts, the display module and the lower housing.

2. The handheld electronic device as claimed in claim 1, further comprising a second cushion propped between the upper housing and the display module.

3. The handheld electronic device as claimed in claim 1, wherein the display module includes a frame and a display panel, the frame carries the display panel, and the position posts are connected to a bottom portion of the frame.

4. The handheld electronic device as claimed in claim 1, wherein the actuator includes a piezoelectric component.

5. The handheld electronic device as claimed in claim 1, wherein the upper housing includes a slant surface, propped against the display module, the display module is adapted to shift along the slant surface, generating the displacement relative to the slant surface.

6. The handheld electronic device as claimed in claim 1, wherein the display module includes a first clamp portion and a second clamp portion, respectively clamping two ends of the actuator, the upper housing includes a third clamp portion for clamping a middle of the actuator, the actuator is enabled to bend so as to force the third clamp portion to shift relative to the first clamp portion and the second clamp portion.

7. The handheld electronic device as claimed in claim 1, wherein the display module includes a fourth clamp portion for clamping the middle of the actuator, the upper housing includes a fifth clamp portion and a sixth clamp portion, for respectively clamping two ends of the actuator, the actuator is enabled to bend so as to force the fourth clamp portion to shift relative to the fifth clamp portion and the sixth clamp portion.

8. The handheld electronic device as claimed in claim 1, wherein each of the first cushions includes a washer, each of the washers surround the corresponding position post, and each of the washers includes a groove encircled on an outer circumferential surface of the washer, the partition is wedged into the groove through the position hole.

9. The handheld electronic device as claimed in claim 1, further comprising a plurality of locking elements, respectively fixed on an end of the position posts, each of the locking elements includes a head portion, an outer diameter of the head portion is greater than an outer diameter of the position post, and the display module and the head portion respectively prop against a top side and a bottom side of the washer.

* * * * *